June 19, 1945.     J. O. IVERSON     2,378,636
HYDROGEN FLUORIDE ALKYLATION PROCESS
Filed Sept. 30, 1943
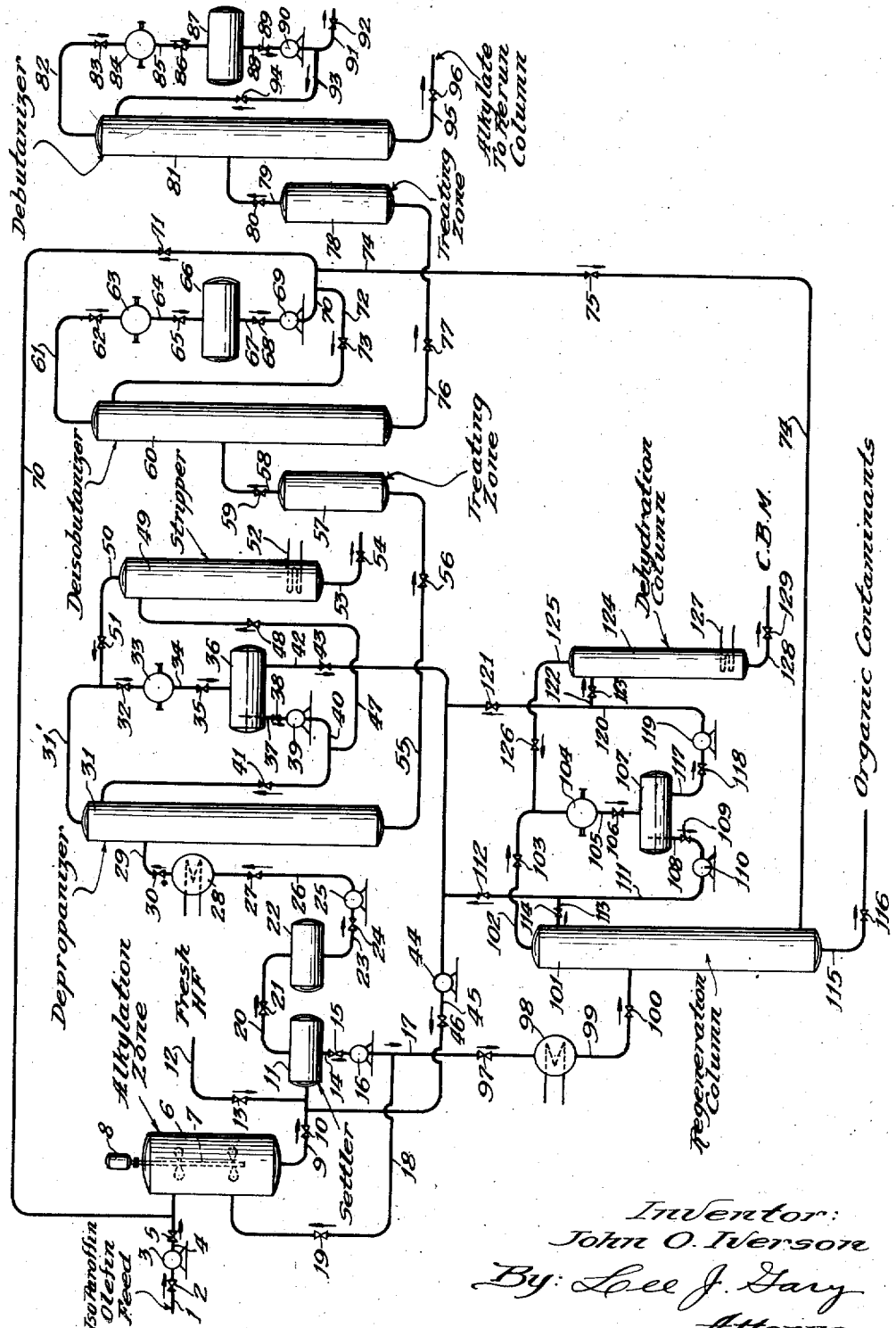
Inventor:
John O. Iverson
By: Lee J. Gary
Attorney Patented June 19, 1945

2,378,636

UNITED STATES PATENT OFFICE 2,378,636

HYDROGEN FLUORIDE ALKYLATION PROCESS

John O. Iverson, Chicago, Ill., assignor to Universal Oil Products Company, Chicago, Ill., a corporation of Delaware Application September 30, 1943, Serial No. 504,425

9 Claims. (Cl. 260—683.4)

This application is a continuation-in-part of my copending application Serial No. 404,607, filed July 30, 1941.

This invention relates to an improved process for the reaction of isoparaffins with olefins in the presence of a hydrogen fluoride catalyst, and it is more particularly concerned with a combination of related and cooperative steps whereby the process may be operated more efficiently.

The reaction of isoparaffins with olefins in the presence of hydrogen fluoride as a catalyst has been proposed as a method of producing a valuable motor fuel of high antiknock value suitable for aviation engines and as a blending agent to increase the antiknock rating of other motor fuels. In previously known processes for reacting isoparaffins with olefins, a liquid mixture of isoparaffins and olefins was agitated together with liquid hydrogen fluoride until the reaction was complete, and the resultant mixture was then allowed to settle in order to separate the hydrocarbon product from the hydrogen fluoride. In this invention means for recovering and regenerating the hydrogen fluoride catalyst are provided which will reduce the operating cost of the process materially and are therefore highly desirable from a commercial viewpoint.

In a broad aspect the invention comprises a process for reacting an isoparaffin with a propylene-containing fraction in the presence of hydrogen fluoride wherein propane and dissolved hydrogen fluoride are separated from the hydrocarbon products, the separated propane is withdrawn from the system, and the separated hydrogen fluoride is returned to the alkylation step.

In one specific embodiment the present invention comprises reacting isobutane with a propylene-containing fraction in the presence of hydrogen fluoride, separating the bulk of the hydrogen fluoride catalyst from the hydrocarbon products, returning at least a portion of said separated hydrogen fluoride to the alkylation step, introducing the hydrocarbon products containing a relatively small amount of dissolved hydrogen fluoride to a first fractionation step and therein separating a fraction comprising propane and hydrogen fluoride, condensing said propane-hydrogen fluoride fraction to form a hydrogen fluoride layer and a hydrocarbon layer, returning said hydrogen fluoride layer to the alkylation step, introducing said hydrocarbon layer to a second fractionation step and therein separating dissolved hydrogen fluoride from propane, returning the hydrogen fluoride separated in said second fractionation step to the alkylation step, and withdrawing from said second fractionation step propane which is substantially free of hydrogen fluoride.

Hydrogen fluoride is slightly soluble in hydrocarbons. Therefore, the products from the alkylation zone will contain a small amount of the order of 1% of dissolved hydrogen fluoride. The fractionation step following the reaction zone is operated so as to remove propane or other light gases present and also the dissolved hydrogen fluoride. In order to remove the hydrogen fluoride, which has a higher boiling point than either butane or propane, it is necessary to vaporize a relatively large quantity of hydrocarbons. If no propane is to be removed from the reaction products, the hydrogen fluoride may be removed by vaporizing, condensing, and refluxing higher boiling hydrocarbons. This step of removing and recovering the dissolved hydrogen fluoride from the product is important because the presence of hydrogen fluoride in the finished product would present a serious corrosion problem and possible health hazard and would increase the amount of catalyst that would have to be added to the process.

The hydrogen fluoride catalyst tends to lose a substantial proportion of its activity after a period of use. This decrease in activity is mainly due to two factors, namely, the contamination of the hydrogen fluoride with organic material and the dilution with water. Although it is not known whether the nature of the contamination is a solution effect or a loose chemical combination, it has been discovered that this contaminating organic material can be removed and the activity of the catalyst restored by heating and distilling off the active hydrogen fluoride.

Hydrogen fluoride has a great affinity for water and it is very difficult to remove water from the catalyst by any ordinary dehydrating methods. Although the incoming charge may be very nearly dry, nevertheless, the catalyst will gradually accumulate water. This water not only reduces the catalyst activity but also makes the hydrogen fluoride more corrosive to the apparatus in which it is handled. It is desirable to maintain the concentration of water in the hydrogen fluoride below about 10% by weight.

In the process of this invention, the water is removed from the catalyst in a fractionation step in which substantially dry hydrogen fluoride is distilled off and a mixture of hydrogen fluoride and water is withdrawn as reflux condensate. This mixture may be a constant boiling mixture containing about 35 to 40% of hydrogen fluoride or some other mixture of higher hydrogen fluoride content.

Any suitable apparatus or reactor may be employed to contact the hydrocarbon reactants with the liquid catalyst in the reaction zone. It is only essential that very intimate contact between the two liquids be maintained for a period of time sufficient for the reaction. In general, some form of agitation, such as mixing, stirring, etc., is used, which produces an intimate mixture or emulsion of hydrocarbon and hydrogen fluoride.

The accompanying diagrammatic drawing illustrates one specific form of apparatus embodying the features of the invention and in which the process of the invention may be conducted.

Referring to the drawing, a paraffin-olefin feed comprising, for example, isobutane, normal butane, propylene, and propane is passed as a liquid under pressure through line 1, valve 2, and charge pump 3 to line 4 containing valve 5. The charge is combined in line 4 with a recycled isobutane fraction from line 70. The combined feed from line 4 is admitted to alkylation zone 6 which is provided with an agitator 7 driven by motor 8, and the interaction of olefinic and isoparaffinic hydrocarbons is effected in zone 6. Generally, some means of removing the heat of reaction from zone 6 must be provided, e. g., an internal cooler or heat exchanger not shown. The emulsion of hydrocarbons and hydrogen fluoride from zone 6 is withdrawn through line 9 and valve 10 to alkylation settler 11 wherein hydrogen fluoride settles out into a lower layer and is withdrawn through line 14 and valve 15 as shown. A substantial portion of this catalyst layer is recycled by means of pump 16 through line 17, line 18, and valve 19 to alkylation zone 6. The hydrocarbon layer from alkylation settler 11 passes through line 20 and valve 21 to depropanizer charge tank 22. Fresh hydrogen fluoride is introduced through line 12 containing valve 13 and thence through line 9 to settler 11. Introduction of the fresh catalyst at this point avoids contacting concentrated hydrogen fluoride with olefins in the feed and the danger of olefin polymerization is thus minimized.

The hydrocarbon products containing a relatively small amount of dissolved hydrogen fluoride are withdrawn from charge tank 22 through line 23 containing valve 24 and are introduced by means of pump 25 through line 26 containing valve 27, heat exchanger 28, and line 29 containing valve 30 to fractionating column 31. In this column propane and dissolved hydrogen fluoride are separated overhead through line 31' and are passed through valve 32 to condenser 33 and thence through rundown line 34 containing valve 35 to receiver 36. In order to remove all of the dissolved hydrogen fluoride from the hydrocarbon products it is necessary to supply a relatively large quantity of hydrocarbon reflux to column 31. The hydrogen fluoride removed overhead in column 31 is present in receiver 36 in substantial excess of its solubility in the hydrocarbons present and, therefore, two layers are formed. The lower hydrogen fluoride layer is withdrawn through catalyst return line 42 containing valve 43 and is supplied by means of pump 44 through line 45 containing valve 46 to line 9 and thence into settler 11. The upper hydrocarbon layer in receiver 36 is withdrawn through line 37 containing valve 38 and a substantial portion thereof is returned by means of pump 39 through line 40 and valve 41 as reflux to fractionator 31.

When an isoparaffin is alkylated with a propylene fraction in the presence of hydrogen fluoride, substantial amounts of propane are introduced into the system and must be removed from the products prior to the recycling of unconverted isoparaffin in order to avoid the accumulation of propane within the system. Accordingly, a portion of the hydrocarbon layer from receiver 36 is diverted from line 40 through line 47 containing valve 48 to fractionator 49 which comprises a hydrogen fluoride "stripper" provided with reboiler 52. The hydrocarbon charge to fractionator 49 is substantially saturated with hydrogen fluoride and in this column sufficient propane is vaporized overhead to remove all of the dissolved hydrogen fluoride. The propane-hydrogen fluoride mixture is withdrawn through line 50 containing valve 51 and is directed through line 31' containing valve 32 to condenser 33 and thence through line 34 and valve 35 to receiver 36 wherein the hydrogen fluoride thus recovered is separated and eventually returned to the alkylation system. A propane stream which is substantially free of hydrogen fluoride is withdrawn from the bottom of fractionator 49 through line 53 containing valve 54. The hydrogen fluoride "stripper" is necessary in order to recover the small but significant portion of catalyst which would be lost from the system by the withdrawal of propane and also in order to produce a propane stream which is free of corrosive material and can therefore be utilized as a fuel or for other purposes without purification.

The remainder of the hydrocarbon products are withdrawn from column 31 through line 55 containing valve 56 and are treated in zone 57 with a suitable treating agent, e. g., bauxite., for the removal of organically combined fluorine. The treated products pass through line 58 and valve 59 to deisobutanizer 60 wherein isobutane is removed overhead through line 61 and valve 62 and is condensed in condenser 63. The condensate is directed through line 64 containing valve 65 to receiver 66. A substantial portion of the unconverted isobutane is recycled through line 67 containing valve 68, pump 69, and line 70 containing valve 71 to the alkylation zone as hereinbefore described. A portion of the excess isobutane condensate is returned through line 72 and valve 73 as reflux to column 60.

The remaining hydrocarbons which are substantially free of isobutane are removed from column 60 through line 76 containing valve 77 and are subjected to a second treating operation in zone 78 for the removal of organically combined fluorine. The treated products pass through line 79 and valve 80 to debutanizer 81 wherein normal butane introduced with the charging stock is recovered overhead through line 82 and valve 83. The overhead stream is condensed in condenser 84 and the condensate passes through line 85 containing valve 86 to receiver 87. The normal butane condensate is withdrawn through line 88 containing valve 89, pump 90, and line 91 containing valve 92. A portion of the normal butane condensate is returned through line 93 containing valve 94 to column 81 as reflux. Alkylation products are withdrawn from column 81 through line 95 and valve 96. These products may be subjected to further fractionation in a rerun column not shown wherein gasoline boiling range alkylate is separated from higher boiling alkylation products.

In order to maintain the catalyst activity in the reaction system, a small portion of the catalyst is regenerated continuously or intermittently as hereinafter described. Hydrogen fluoride catalyst containing organic contaminating materials is passed from pump 16 through line 17 containing valve 97, heat exchanger 98, and line 99 containing valve 100 to fractionator 101 wherein a purified hydrogen fluoride fraction is taken overhead through line 102 and valve 103, condenser 104, and line 105 containing valve 106 to receiver 107. A relatively heavy fraction comprising the organic contaminants is withdrawn from the bottom of fractionator 101 through line 115 and valve 116. The purified hydrogen fluoride fraction removed overhead in column 101 comprises hydrogen fluoride, water, and low boiling hydrocarbons, e. g. isobutane. In order to assist in the regeneration of the catalyst by releasing free hydrogen fluoride from the organic contaminants it is desirable to introduce isobutane or other isoparaffin into the regeneration column. This is most conveniently carried out by diverting a portion of the condensate from line 70 through line 74 and valve 75 to the bottom of regeneration column 101. In actual practice the isobutane is most conveniently added to the reboiler of column 101. Since both hydrocarbon and hydrogen fluoride are present in the overhead from column 101, two phases will be formed in receiver 107. The upper hydrocarbon layer is withdrawn through line 108 containing valve 109 and a substantial portion thereof is returned by means of pump 110 through line 111 containing valve 112 to catalyst return line 42 and is thereby recycled to the alkylation system. In order to supply sufficient hydrocarbon reflux to column 101 to remove all of the hydrogen fluoride overhead, a portion of the hydrocarbon condensate is returned through line 113 and valve 114 to the top of column 101.

The purified liquid hydrogen fluoride in receiver 107 is withdrawn through line 117 and valve 118 to pump 119 which discharges through line 120 and valve 121 to catalyst return line 42 and the regenerated catalyst is thereby returned to the alkylation system. In order to control the water content of the catalyst in the alkylation system, a portion of the stream in line 120 is passed through line 122 and valve 123 to fractionator 124 provided with reboiler 127. In this fractionator any water that is present in the hydrogen fluoride is removed in the reflux condensate as a mixture, usually an azeotropic or constant boiling mixture, of water and hydrogen fluoride through line 128 and valve 129. Dry hydrogen fluoride is withdrawn overhead from fractionator 124 through line 125 and valve 126 and is passed through line 102, condenser 104, line 105, and valve 106 to receiver 107.

It will, of course, be understood that the invention is not limited to the specific form of apparatus illustrated and above described, since other forms of apparatus may be utilized to accomplish substantially the same results. For example, a flash regeneration system is often useful in which case fractionator 101 is replaced with a flashing zone wherein a controlled partial vaporization or flash distillation of the contaminated catalyst is carried out. Isobutane may also be supplied to the flashing zone if desired. In this method of operation it is not necessary to reflux the flashing zone with hydrocarbon distillate.

One difficulty involved in the above described catalyst regeneration processes is in controlling the fractional distillation so that the more corrosive constant boiling mixture of hydrogen fluoride and water does not accumulate in any part of the apparatus where it would be harmful. In cases where corrosion resistant materials of construction are not employed the top temperature of the regeneration fractionator is maintained sufficiently high to insure that the water is carried overhead thus minimizing the danger of constant boiling mixture accumulating in the column. If the regeneration column is constructed of corrosion resistant materials, the top temperature of the column is not as important since in that case the constant boiling mixture can be withdrawn from the top or bottom of the column or even from some intermediate point. A constant boiling mixture vaporizes at approximately 235° F. at atmospheric pressure, and at higher temperatures with elevated pressures.

The second catalyst regeneration fractionator shown in the drawing will ordinarily be quite small and can be built of materials that will withstand the corrosive effects of hydrogen fluoride-water mixtures which accumulate and are withdrawn as reflux condensate.

The preferred range of operating conditions which may be employed in an apparatus such as illustrated and above described for conducting the processes of the invention, may be approximately as follows:

The pressure in the alkylation zone may be from 125 to 200 pounds per square inch or higher although it is only necessary to use enough pressure to maintain both catalyst and hydrocarbon substantially in the liquid phase. The temperature in the reaction zone may be within the range of from about 0° F. to about 150° F. The "space time," defined as the volume of catalyst in the reaction zone divided by the volumes per minute of hydrocarbon feed to the reaction zone, may be from about 5 to about 80 minutes. Although the ratio of hydrocarbon to hydrogen fluoride in the reaction zone may vary considerably, a suitable ratio will be in the range of 0.5 to 10 volumes of hydrocarbon to 1 volume of hydrogen fluoride. The ratio of isoparaffin to olefin in the combined feed to the reaction zone may also vary considerably depending upon other conditions, but will ordinarily be in the range of from 2 to 10 molecular proportions of isoparaffin per one molecular proportion of olefin.

Although the drawing illustrates specifically a process for alkylating isobutane with propylene, the invention is not limited to this process but may also be applied to the alkylation of other isoparaffins such as isopentane with propylene. The invention also includes within its scope the alkylation of isoparaffins with propylene-containing olefin mixtures, e. g., a propylene-butylene fraction, a propylene-butylene-amylene fraction, etc. When the charging stock contains amylenes it will usually be necessary to provide an additional fractionation step after the debutanizer 81 and before the rerun column. In this additional fractionator pentanes will be separated overhead from the alkylation products. If desired these pentanes can be subjected to still further fractionation for the separation of normal pentane from isopentane the latter being an important component of aviation gasoline blends.

I claim as my invention:

1. An alkylation process which comprises reacting an isoparaffin with a propylene-containing fraction in the presence of a hydrogen fluoride catalyst, separating the bulk of the hydrogen fluoride catalyst from the hydrocarbon products, returning at least a portion of said separated hydrogen fluoride catalyst to the alkylation step, introducing the hydrocarbon products containing a relatively small amount of dissolved hydrogen fluoride to a first fractionation step and therein vaporizing a fraction comprising propane and hydrogen fluoride, condensing said propane-hydrogen fluoride fraction to form a hydrogen fluoride layer and a hydrocarbon layer containing hydrogen fluoride, returning said hydrogen fluoride layer to the alkylation step, introducing said hydrocarbon layer to a second fractionation step and therein vaporizing a sufficient quantity of propane to separate substantially the total hydrogen fluoride content of said hydrocarbon layer, supplying the hydrogen fluoride and propane vapors separated in said second fractionation step to the aforesaid condensing step, and withdrawing from said second fractionation step propane which is substantially free from hydrogen fluoride.

2. The process of claim 1 wherein said isoparaffin comprises isobutane.

3. An alkylation process which comprises reacting an isoparaffin with a propylene-containing fraction under alkylating conditions in the presence of hydrogen fluoride, separating the bulk of the used catalyst from the hydrocarbon reaction products, returning at least a portion of said used catalyst to the alkylation step, subjecting another portion of said used catalyst to heating and distillation steps wherein hydrogen fluoride is separated from organic contaminants present in said used catalyst, returning the hydrogen fluoride separated in said heating and distillation steps to said alkylation step, introducing the hydrocarbon reaction products containing a relatively small amount of dissolved hydrogen fluoride to a first fractionation step and therein vaporizing a fraction comprising propane and hydrogen fluoride from higher boiling hydrocarbons, condensing said fraction to form a hydrogen fluoride layer and a hydrocarbon layer containing hydrogen fluoride, returning said hydrogen fluoride layer to the alkylation step, introducing the hydrocarbon layer to a second fractionation step and therein vaporizing a sufficient quantity of propane to separate substantially the total hydrogen fluoride content of said hydrocarbon layer, supplying the hydrogen fluoride and propane vapors separated in said second fractionation step to the aforesaid condensing step, recovering from said second fractionation step a propane stream substantially free from hydrogen fluoride, introducing the residual higher boiling hydrocarbons from said first fractionation step to a third fractionation step wherein unconverted isoparaffin is separated from higher boiling hydrocarbons, and returning said unconverted isoparaffin to the alkylation step.

4. The process of claim 3 wherein said isoparaffin comprises isobutane.

5. The process of claim 3 wherein at least a portion of the hydrogen fluoride separated in said heating and distillation steps is subjected to further fractionation wherein substantially anhydrous hydrogen fluoride is separated from a hydrogen fluoride-water mixture and said substantially anhydrous hydrogen fluoride is returned to the alkylation step.

6. The process of claim 1 wherein said alkylation step is conducted at a temperature of from about 0° F. to about 150° F. and under sufficient pressure to maintain the catalyst and hydrocarbons substantially in the liquid phase and wherein the hydrocarbons charged to the alkylation step contain from about 2 to about 10 molecular proportions of isoparaffin per 1 molecular proportion of olefin.

7. The process of claim 1 wherein said propylene-containing fraction comprises propylene and butylene.

8. The process of claim 1 wherein said propylene-containing fraction comprises propylene, butylene, and amylene.

9. In the alkylation of an isoparaffin with an olefinic fraction containing propane in the presence of hydrogen fluoride catalyst wherein there is separated from the bulk of the catalyst a hydrocarbon mixture containing propane and dissolved hydrogen fluoride, the method which comprises fractionating said mixture to vaporize the propane and hydrogen fluoride therefrom, condensing the resultant vapors thereby forming a hydrogen fluoride layer and a propane layer containing hydrogen fluoride, returning the first-mentioned layer to the alkylation step, subjecting the second-mentioned layer to further fractionation and vaporizing a sufficient quantity of its propane content to carry off as vapor substantially all of the hydrogen fluoride contained in said second-mentioned layer, commingling the resultant vapors of propane and hydrogen fluoride with the vapors from the first-mentioned fractionating step for condensation therewith, and removing from the second-mentioned fractionating step a propane fraction substantially free of hydrogen fluoride.

JOHN O. IVERSON.

DISCLAIMER 2,378,636.—*John O. Iverson*, Chicago, Ill. HYDROGEN FLUORIDE ALKYLATION PROCESS. Patent dated June 19, 1945. Disclaimer filed July 11, 1947, by the assignee, *Universal Oil Products Company*.

Hereby enters this disclaimer to claims 1, 2, and 9 of said patent.

[*Official Gazette August 26, 1947.*]

a relatively small amount of dissolved hydrogen fluoride to a first fractionation step and therein vaporizing a fraction comprising propane and hydrogen fluoride, condensing said propane-hydrogen fluoride fraction to form a hydrogen fluoride layer and a hydrocarbon layer containing hydrogen fluoride, returning said hydrogen fluoride layer to the alkylation step, introducing said hydrocarbon layer to a second fractionation step and therein vaporizing a sufficient quantity of propane to separate substantially the total hydrogen fluoride content of said hydrocarbon layer, supplying the hydrogen fluoride and propane vapors separated in said second fractionation step to the aforesaid condensing step, and withdrawing from said second fractionation step propane which is substantially free from hydrogen fluoride.

2. The process of claim 1 wherein said isoparaffin comprises isobutane.

3. An alkylation process which comprises reacting an isoparaffin with a propylene-containing fraction under alkylating conditions in the presence of hydrogen fluoride, separating the bulk of the used catalyst from the hydrocarbon reaction products, returning at least a portion of said used catalyst to the alkylation step, subjecting another portion of said used catalyst to heating and distillation steps wherein hydrogen fluoride is separated from organic contaminants present in said used catalyst, returning the hydrogen fluoride separated in said heating and distillation steps to said alkylation step, introducing the hydrocarbon reaction products containing a relatively small amount of dissolved hydrogen fluoride to a first fractionation step and therein vaporizing a fraction comprising propane and hydrogen fluoride from higher boiling hydrocarbons, condensing said fraction to form a hydrogen fluoride layer and a hydrocarbon layer containing hydrogen fluoride, returning said hydrogen fluoride layer to the alkylation step, introducing the hydrocarbon layer to a second fractionation step and therein vaporizing a sufficient quantity of propane to separate substantially the total hydrogen fluoride content of said hydrocarbon layer, supplying the hydrogen fluoride and propane vapors separated in said second fractionation step to the aforesaid condensing step, recovering from said second fractionation step a propane stream substantially free from hydrogen fluoride, introducing the residual higher boiling hydrocarbons from said first fractionation step to a third fractionation step wherein unconverted isoparaffin is separated from higher boiling hydrocarbons, and returning said unconverted isoparaffin to the alkylation step.

4. The process of claim 3 wherein said isoparaffin comprises isobutane.

5. The process of claim 3 wherein at least a portion of the hydrogen fluoride separated in said heating and distillation steps is subjected to further fractionation wherein substantially anhydrous hydrogen fluoride is separated from a hydrogen fluoride-water mixture and said substantially anhydrous hydrogen fluoride is returned to the alkylation step.

6. The process of claim 1 wherein said alkylation step is conducted at a temperature of from about 0° F. to about 150° F. and under sufficient pressure to maintain the catalyst and hydrocarbons substantially in the liquid phase and wherein the hydrocarbons charged to the alkylation step contain from about 2 to about 10 molecular proportions of isoparaffin per 1 molecular proportion of olefin.

7. The process of claim 1 wherein said propylene-containing fraction comprises propylene and butylene.

8. The process of claim 1 wherein said propylene-containing fraction comprises propylene, butylene, and amylene.

9. In the alkylation of an isoparaffin with an olefinic fraction containing propane in the presence of hydrogen fluoride catalyst wherein there is separated from the bulk of the catalyst a hydrocarbon mixture containing propane and dissolved hydrogen fluoride, the method which comprises fractionating said mixture to vaporize the propane and hydrogen fluoride therefrom, condensing the resultant vapors thereby forming a hydrogen fluoride layer and a propane layer containing hydrogen fluoride, returning the first-mentioned layer to the alkylation step, subjecting the second-mentioned layer to further fractionation and vaporizing a sufficient quantity of its propane content to carry off as vapor substantially all of the hydrogen fluoride contained in said second-mentioned layer, commingling the resultant vapors of propane and hydrogen fluoride with the vapors from the first-mentioned fractionating step for condensation therewith, and removing from the second-mentioned fractionating step a propane fraction substantially free of hydrogen fluoride.

JOHN O. IVERSON.

DISCLAIMER 2,378,636.—*John O. Iverson*, Chicago, Ill. HYDROGEN FLUORIDE ALKYLATION PROCESS. Patent dated June 19, 1945. Disclaimer filed July 11, 1947, by the assignee, *Universal Oil Products Company*.

Hereby enters this disclaimer to claims 1, 2, and 9 of said patent.

[*Official Gazette August 26, 1947.*]